US011440677B2

(12) United States Patent
Andrus et al.

(10) Patent No.: US 11,440,677 B2
(45) Date of Patent: Sep. 13, 2022

(54) SECURED BACKUP FEATURE FOR AN EMBEDDED SYSTEM (71) Applicants: Rolls-Royce Corporation, Indianapolis, IN (US); Rolls-Royce North American Technologies, Inc., Indianapolis, IN (US)

(72) Inventors: Dawn Kay Andrus, Plainfield, IN (US); Daniel John Bitz, Avon, IN (US); Richard Joseph Skertic, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 67 days.

(21) Appl. No.: 16/193,467

(22) Filed: Nov. 16, 2018

(65) Prior Publication Data

US 2020/0156805 A1 May 21, 2020

(51) Int. Cl.
*B64D 45/00* (2006.01)
*B64D 31/04* (2006.01)
(Continued)

(52) U.S. Cl.
CPC ......... *B64D 45/0015* (2013.01); *B64D 31/04* (2013.01); *B64D 31/06* (2013.01); *F02D 41/3082* (2013.01); *B64D 45/0063* (2019.08)

(58) Field of Classification Search
CPC ............... B64D 45/0015; B64D 31/04; B64D 45/0063; B64D 31/06; F02D 41/3082;
(Continued)

(56) References Cited

U.S. PATENT DOCUMENTS 4,397,148 A * 8/1983 Stockton .................. F02C 9/46
60/223
4,718,229 A * 1/1988 Riley ........................ F02C 7/25
60/39.281
(Continued)

FOREIGN PATENT DOCUMENTS

EP 1707779 A2 10/2006

OTHER PUBLICATIONS

Arvin et al., "T406 Engine Development Program", Gas Turbine and Aeroengine Congress and Exposition, Jun. 1990, 9 pgs.
(Continued)

*Primary Examiner* — Nadeem Odeh
(74) *Attorney, Agent, or Firm* — Shumaker & Sieffert, P.A.

(57) ABSTRACT

A system is described that includes a controllable component of an engine configured to regulate fuel flow to the engine, a digital control unit configured to control the engine by at least communicating with the controllable component of the engine, and a protection component configured to disable communication between the digital control unit and the controllable component of the engine. The system further includes an analog control unit configured to control the engine by at least communicating with the controllable component of the engine in response to the protection component disabling communication between the digital control unit and the controllable component of the engine.

18 Claims, 2 Drawing Sheets (51) Int. Cl.
*B64D 31/06* (2006.01)
*F02D 41/30* (2006.01)

(58) Field of Classification Search
CPC .. F05D 2270/094; F05D 2260/84; F02C 9/46; F02C 9/26
See application file for complete search history.

(56) References Cited

U.S. PATENT DOCUMENTS

| | | | | |
|---|---|---|---|---|
| 5,440,490 | A * | 8/1995 | Summerfield | F02C 9/46 60/243 |
| 6,568,166 | B2 * | 5/2003 | Jay | F02C 9/46 60/39.281 |
| 9,140,190 | B2 * | 9/2015 | Portolese | F02C 7/232 |
| 10,235,523 | B1 * | 3/2019 | Keller, III | G06F 13/4282 |
| 10,669,950 | B2 * | 6/2020 | Dooley | H02K 7/1823 |
| 2003/0056494 | A1 * | 3/2003 | Coleman | F02C 9/46 60/239 |
| 2003/0093187 | A1 * | 5/2003 | Walker | B64D 45/0059 701/1 |
| 2007/0029449 | A1 * | 2/2007 | Matos | G08G 5/0056 244/195 |
| 2008/0309261 | A1 * | 12/2008 | Anson | F02C 7/232 318/53 |
| 2010/0079003 | A1 * | 4/2010 | Bethel | H02M 3/04 307/66 |
| 2011/0173988 | A1 * | 7/2011 | Sweet | F02C 9/44 60/773 |
| 2012/0101663 | A1 * | 4/2012 | Fervel | G05B 9/03 701/3 |
| 2014/0191591 | A1 * | 7/2014 | Kasztenny | H01H 47/00 307/141 |
| 2015/0285092 | A1 * | 10/2015 | Chevalier | F01D 17/162 415/1 |
| 2019/0032573 | A1 * | 1/2019 | Priat | F02C 9/28 |
| 2019/0265688 | A1 * | 8/2019 | Shahroudi | G05B 19/41875 |

OTHER PUBLICATIONS

Extended European Search Report from counterpart EP Application No. 19207403.7 dated Apr. 8, 2020, 6 pgs.
Response to Extended European Search Report from counterpart EP Application No. 19207403.7 dated Apr. 8, 2020, filed Nov. 11, 2020, 50 pgs.
Response to Communication pursuant to Article 94(3) EPC dated Jan. 24, 2022, from counterpart European Application No. 19207403.7 filed Mar. 29, 2022, 46 pp.
Communication pursuant to Article 94(3) EPC from counterpart European Application No. 19207403.7 dated Jan. 24, 2022, 6 pp.

* cited by examiner

SECURED BACKUP FEATURE FOR AN EMBEDDED SYSTEM

TECHNICAL FIELD

The disclosure relates to embedded systems and control systems, e.g., for an aircraft system or other embedded system.

BACKGROUND

Embedded electrical and computing systems are used in many applications, including manned and unmanned vehicle control systems, as well as other types of control systems. For instance, flight control systems, engine control systems, generator control systems, and the like, are examples of embedded electrical and computing systems. These types of embedded systems may be exposed, during regular operational use, to a variety of different types of hostile cyberattacks. For example, an unauthorized user may try to circumvent access controls to take command of an engine control system of an aircraft, e.g., to induce damage to the engine, or worse, crash the aircraft.

SUMMARY

In one example, the disclosure is directed to a system including: a controllable component of an engine configured to regulate fuel flow to the engine; a digital control unit configured to control the engine by at least communicating with the controllable component of the engine; a protection component configured to disable communication between the digital control unit and the controllable component of the engine; and an analog control unit configured to control the engine by at least communicating with the controllable component of the engine in response to the protection component disabling communication between the digital control unit and the controllable component of the engine.

In another example, the disclosure is directed to a method including: controlling, with a digital engine controller of a system, a controllable component of an engine of the system to control the engine of the system; ceasing controlling the controllable component of the engine with the digital engine controller; and responsive to ceasing controlling the controllable component of the engine with the digital engine controller, controlling, with an analog engine controller of the system, the controllable component of the engine to control the engine.

In yet another example, the disclosure is directed to a system comprising: means for controlling, with a digital engine controller, a controllable component of an engine to control the engine; means for ceasing controlling the controllable component of the engine with the digital engine controller; and means for responsive to ceasing controlling the controllable component of the engine with the digital engine controller, controlling, with an analog engine controller, the controllable component of the engine to control the engine.

The details of one or more examples are set forth in the accompanying drawings and the description below. Other features, objects, and advantages of the disclosure will be apparent from the description and drawings, and from the claims.

DETAILED DESCRIPTION

During a cyberattack on an embedded system (e.g., an engine control system, etc.) a malicious party may try to control the embedded system to disrupt, damage, or even destroy the underlying aircraft, vehicle, or other application in which the embedded system is used. For example, in an aircraft, if a malicious party takes over an engine control system during a cyberattack, the malicious party may try to shut down, overspeed, or otherwise command the engines in a way that adversely impacts aircraft performance, potentially leading to a crash. In some cases, the only way to protect a system from hostile cyberattacks may be to disconnect or shut down an affected sub-system. Simply shutting down an engine control system or other full authority digital engine controller (FADEC) system as a way to thwart an attack may not always be an option, particularly for life-supporting, safety critical, or mission critical FADEC systems, like those found in aircraft and submersibles.

Some embedded systems may be paired with a backup system. Backup systems may be used as a hedge against surviving a cyberattack. However, some backup systems meant to take-over in cases where a sub-system becomes non-operational due to a hostile cyberattack may be just as vulnerable to malicious attacks, as the embedded systems for which the backup systems are meant to protect. For example, a backup system to an engine control system of an aircraft may be directly, or indirectly, coupled to the engine control system (e.g., both systems may use a common power supply, both systems may receive commands from a common flight controller, etc.); an attacker may try to exploit the direct or indirect coupling between the engine control system and the backup system, e.g., to damage the engine control system and the backup engine control system alike.

In general, techniques and circuits of this disclosure may enable a system to have analog backup components that are less susceptible to the kinds of malicious attacks that may be experienced by digital components of the system that the backup systems are meant to protect. In particular, the described circuits and techniques may enable a system, such as an engine control system of an aircraft or other manned or unmanned vehicle, to rely on isolated, analog components as back-up to counterpart, digital components that may malfunction, e.g., due to a malicious cyberattack, or other electrical disruption or event. In some cases, the backup features may engage automatically without user input to the system. In other cases, the backup features only engage after the system receives a specific user input. In either case, switching from reliance on compromised digital hardware to reliance on analog backup hardware may be a one-way, and irreversible action, thereby helping to ensure the analog backup hardware are not undermined from an attack or other disruption to the system.

By relying on analog backup components, e.g., for critical components, to take over responsibilities previously handled by damaged or otherwise affected, digital components, an example system is less likely to experience a total system failure from a malicious attack. The described circuits and techniques may further provide enhanced protections and act as a failsafe to a system that may experience electromagnetic-pulse (EMP) or nuclear events. Because some analog components may be less susceptible to interference or damage from EMP or nuclear events, a system that relies on the described circuits and techniques may be more robust during such events, compared to other systems that rely on digital backup components alone.

Figure 1:
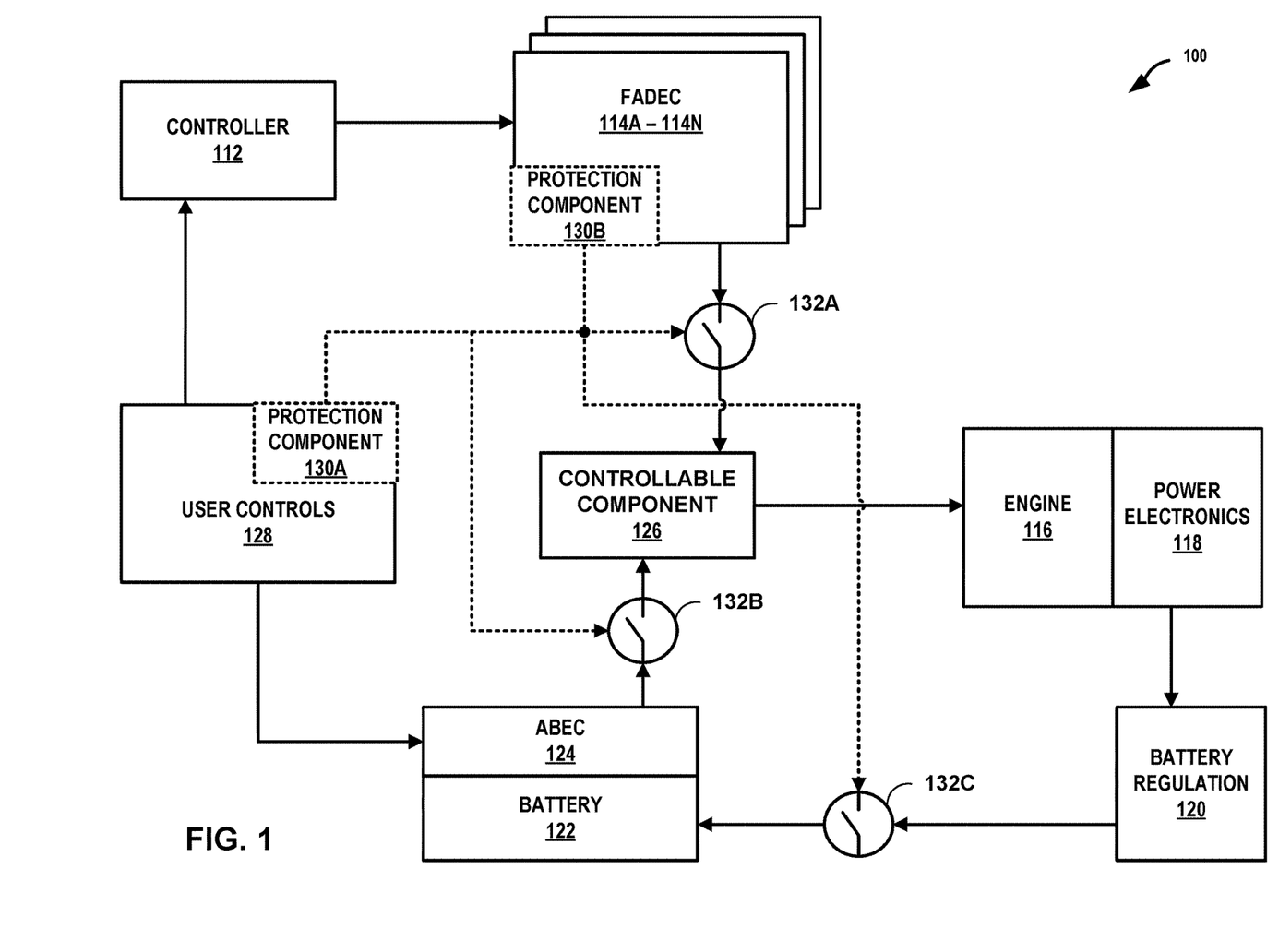
FIG. 1 is a conceptual diagram illustrating an example system that includes an analog backup to one or more digital control units, in accordance with one or more aspects of the present disclosure.

FIG. 1 is a conceptual diagram illustrating an example system that includes an analog backup to one or more digital control units, in accordance with one or more aspects of the present disclosure. System 100 is one example of an engine control system, for example, as used on manned and unmanned aircraft vehicles. An engine control system is just one example of system 100 and many other types of systems, beyond just aircraft and vehicles, may benefit from the techniques and circuits of this disclosure. System 100 may be any system that can support supplemental, protection from catastrophic failure of digital components and circuitry, including, but not limited to, vehicle systems, electrical power systems, communication systems, safety critical, environmental, or life-sustaining systems (e.g., refrigerators, incubators, pressurized compartments, etc.). System 100 includes controller 112, FADEC 114A through 114N (collectively referred to as "FADECs 114"), engine 116, power electronics 118, battery regulation component 120, battery 122, analog backup engine controller (ABEC) 124, a controllable component 126 of engine 116, which in the example of FIG. 1 comprises a fuel pump metering unit, user controls 128, one of, or both, protection components 130A and 130B (collectively referred to as "protection components 130"), and isolation components 132A through 132C (collectively referred to as "isolation components 132").

Engine 116 may be any type of engine or machine that produces mechanical power. For example, engine 116 may be a gas-turbine, gas combustion, diesel, or other type of engine that performs work, such as turning a shaft, that powers a machine.

Power electronics 118 is an example of one or more electric machines that derives electrical power from engine 116. Power electronics 118 may include one or more generators, inverters, converters, rectifiers, filters, or other components configured to convert the mechanical power being output by engine 116 into a suitable form of electrical power used by other components of system 100. Engine 116 and/or power electronics 118 may include any necessary drive shafts, gearboxes, or other coupling features to configure power electronics 118 to receive power from engine 116. Other components of system 100 may receive electrical power from power electronics 118. For example, controller 112 and FADECs 114 may receive electrical power from power electronics 118.

Battery 122 represents an energy source electrically coupled to ABEC 124. Unlike other components of system 100 that receive electrical power from power electronics 118 or other electrical power sources (not shown in FIG. 1), one component, in particular ABEC 124, may in some examples, receive electrical power from battery 122. ABEC 124 is configured to draw power from battery 122 in response to protection component 130A or 130B disabling communication between FADECs 114 and controllable component 126. In some examples, battery 122 may be a power source dedicated to ABEC 124, and the output of battery 122 may not be coupled to any other electronic components.

To prevent ABEC 124 from being exposed to a cyberattack at other parts of system 100, ABEC 124 may be electrically isolated from other power sources of system 100, such as power electronics 118. Said another way, battery 122 is configured to be isolated at least from FADECs 114 in response to protection component 130A or 130B disabling communication between FADECs 114 and controllable component 126.

With ABEC 124 being independently powered by battery 122, and isolated from power electronics 118, system 100 may prevent power from being cut to ABEC 124 during a cyberattack and may further prevent an attacker from inducing a power surge in system 100 in an attempt to disable ABEC 124.

When not being used to control components of system 100 (e.g., when system 100 is configured for digital control), ABEC 124 may draw little or no electrical power from battery 122. In other words, when configured for digital control, system 100 may cut power to ABEC 124 other than to maintain a charge associated with battery 122, and ABEC 124 may be in a disabled mode, stand-by mode, or otherwise not actively generating control signals for controllable component 126. Conversely, when system 100 is configured for analog control using ABEC 124, ABEC 124 may draw electrical power from battery 122, but no other power source of system 100.

Battery regulation 120 charges and regulates power stored by battery 122. Battery regulation 120 controls how much electrical power reaches battery 122. That is, battery regulation 120 may adjust how much electrical power being produced by power electronics 118 reaches or does not reach battery 122. Battery regulation 120 may perform tasks necessary to ensure that battery 122 remains at a charged level to support operations performed by ABEC 124, e.g., during a critical failure of parts of system 100. With battery regulation 120 charging battery 122, FADECs 114 are configured to receive electrical power produced by power electronics 118 while battery 122 is also configured to receive electrical power produced by power electronics 118. When system 100 is configured for analog control, battery 122 is configured to disconnect from power electronics 118 and cease receiving the electrical power, for example, in response to protection component 130A or 130B controlling isolation components 132 for disabling communication between FADECs 114 and controllable component 126.

Controllable component 126 may be any controllable component of engine 116 that is configured to regulate fuel flow to engine 116. Examples of controllable component 126 include a fuel pump metering unit, a controllable vane, or other controllable component associated with engine 116, for example, that may provide fuel pumping, metering, and/or fuel filtration operations on behalf of engine 116 of system 100. Controllable component 126 may include embedded hardware, software, and/or firmware that, when executed by internal processing components of controllable component 126, configures controllable component 126 to perform fuel pumping, metering, and filtration operations on behalf of engine 116. Controllable component 126 may adjust internal valves to change how much fuel engine 116 receives. When enabled, controllable component 126 may output fuel at variable or constant rate. When disabled, controllable component 126 may prevent fuel from reaching engine 116.

System 100 includes isolation components 132A through 132C. Isolation components 132 represent any type of switches, fuses, breakers, or other types of isolation components that can be controlled to electrically isolate parts of system 100 from other parts of system 100. Isolation components 132 may cease conducting current to create an open-circuit when disabled and conduct current to create a short-circuit when enabled. Isolation components 132 may be irreversible or single-use and therefore configured to change from one state to another state (e.g., disabled to always enabled, or enabled to always disabled) but not in reverse order. In other examples, isolation components 132 may be reversible or multi-use and configured to change back and forth between states.

Controllable component 126 may maintain a persistent fuel connection or interface to engine 116 for delivering fuel to engine 116, e.g., from a fuel tank, reservoir, or other fuel source. Controllable component 126 may receive commands from FADECs 114 or ABEC 124, depending, respectively, on whether isolation components 132A and 132C are enabled while isolation component 132B is disabled, or whether isolation component 132B is enabled while isolation components 132A and 132C are disabled.

As described in greater detail below, when system 100 is configured for digital control using FADECs 114, isolation component 132B is disabled to prevent ABEC 124 from communicating with controllable component 126. In addition, isolation component 132C is enabled to configure battery 122 to receive electrical charge from battery regulation 120. Furthermore, when configured for digital control using FADECs 114, isolation component 132A may be enabled to facilitate communication between FADECs 114 and controllable component 126.

Alternatively, when system 100 is configured for analog control using ABEC 124, isolation components 132A and 132C are disabled thereby preventing battery 122 from receiving electrical charge from battery regulation 120 as well as preventing communication between FADECs 114 and controllable component 126. In addition, when configured for analog control using ABEC 124, isolation component 132B may be enabled to facilitate communication between ABEC 124 and controllable component 126.

Each of FADECs 114 may be any type of digital engine controller or other digital embedded system or backup system. FADECs 114 may be at risk of hostile cyberattacks. Each of FADECs 114 may include any necessary hardware, software, and or firmware needed to perform digital engine control functions to control engine 116. One or more of FADECs 114 is configured to control engine 116 by at least communicating with controllable component 126.

ABEC 124 is an analog counterpart to one or more of FADECs 114. Said another way, ABEC 124 is configured to control engine 116 by at least communicating with controllable component 126, e.g., as described below in response to protection component 130A or 130B disabling communication between FADECs 114 and controllable component 126. Rather than one of FADECs 114 serving a backup role, ABEC 124 is any type of analog engine control system configured to back-up a corresponding digital engine control system. ABEC 124 may include any necessary analog hardware needed to perform analog, engine control functions. For example, FADEC 114A may be a digital engine control unit for engine 116, FADEC 114N may be a backup, digital engine control unit for engine 116, and ABEC 124 may be a backup, analog engine control unit for engine 116.

User controls 128 represent the input and output components of a user interface to system 100. User controls 128 may include any input and/or output components necessary to receive verbal, visual, or tactile cues from a user that then are output as user-initiated commands to FADECs 114 via controller 112, or to ABEC 124. User controls 128 may include various input devices, such as switches, buttons, steering wheels, joysticks, sliders, levers, pedals, shifters, dimmers, dials, presence-sensitive screens, touch-screens, track pads, mice, microphones, cameras, sensors, and the like. User controls 128 may include various output devices, including displays, speakers, vibration devices, light emitters, and other output devices, for instance, to provide a user interface from which a user of system 100 can receive feedback or other information associated with inputs the user may have provided to user controls 128. Some of user controls 128 are operatively coupled to controller 112 and some user controls 128 are operatively coupled to ABEC 124.

Controller 112 is configured to interpret analog or digital inputs received from user controls 128 as commands to any combination of FADECs 114. Controller 112 may include any hardware, software, and/or firmware required to perform operations related to translating user controls into digital commands, as described herein.

Controller 112 may output digital commands to one or more of FADECs 114, based on the inputs received from user controls 128, as well as information received from various other information sources, e.g., sensors, etc. of system 100 that are not shown in FIG. 1. As one example, controller 112 may receive data (e.g., a message, a voltage, etc.) indicating a change in position of a throttle control of user controls 128. Controller 112 may convert (e.g., using a throttle mapping table stored in memory) the change in position of the throttle control to a throttle command associated with FADECs 114. Controller 112 may output an indication of the throttle command, e.g., as a message on a communications bus that couples controller 112 to any of FADECs 114. Any of FADECs 114 that receive the indication of the throttle command may rely on the throttle command to perform various operations or take various actions, behalf of system 100. In this way, controller 112 enables system 100 to allow user control of operations performed by FADECs 114, and ultimately, other components shown and not shown in FIG. 1 that make up the rest of system 100.

In some examples, controller 112 is remote to, and wirelessly coupled with, FADECs 114 and in other examples, controller 112 is collocated and wired or wirelessly coupled with FADECS 114. For example, controller 112 may be part of or communicate with a remote operating station of an unmanned vehicle that includes system 100. Controller 112 may convert inputs received via the remote operating station into commands for controlling FADECs 114 and wirelessly transmit the commands to FADECs 114, e.g., while the unmanned vehicle operates on earth, in the air, or in space. As another example, controller 112 may be co-located to engine 116, e.g., collocated on board a vehicle or within an industrial complex that includes system 100. Controller 112 may convert inputs received via operators of the engines or the encompassing system, for controlling FADECs 114 and wired or wirelessly send the commands to nearby FADECs 114, e.g., FADECs collocated with engine 116 and controller 112.

Each of FADECs 114 may support a different role, or backup role, on behalf of system 100. Each role may be mission or life critical, such that total operational loss of any FADECs 114 that support that role, may render system 100 completely, or nearly, inoperable. For example, FADEC 114A may be an engine control unit associated with engine 116, and FADEC 114N may be a backup, engine control unit associated with engine 116. FADECs 114A and 114N may be configured to perform, redundant, engine control functions so that if, for example, FADEC 114A suffers a cyberattack, system 100 can still safely rely on FADEC 114N to control engine 116.

In some examples, due to shared components or similarities in design, operation, or capability, a single cyberattack may adversely affect multiple FADECs 114, simultaneously. For example, a single cyberattack through a common interface or bus associated with FADECs 114 may impact every one of FADECs 114 that is coupled to the common interface or bus, at the time of the attack. As such, any FADEC 114 that serves a backup role may be rendered useless when a cyberattack is not isolated to a single FADEC 114. For example, FADECs 114A and 114N may be compromised simultaneously during a single cyberattack. Therefore, even if FADEC 114N is a backup to FADEC 114A, FADEC 114N may be prevented from performing the backup role when FADEC 114A is under cyberattack.

As an analog backup electronic control unit, ABEC 124 may receive inputs directly from user controls 128 in cases in which controller 112 and/or FADECs 114 are inoperable or operating under control of an attacker. In other words, a user may provide inputs via user controls 128 that directly control functionality of ABEC 124. Unlike FADECs 114 which rely on controller 112 to translate inputs received from user controls 128 into FADEC commands, ABEC 124 includes dedicated hardware to perform functions and operations in direct response to inputs received from user controls 128.

Although ABEC 124 may provide direct user-response to system 100, ABEC 124 may provide less sophisticated control capability, as compared to a FADEC counterpart. Therefore, even though ABEC 124 may provide an analog, backup role to one or more FADECs 114 of system 100, ABEC 124 may only provide limited backup capability, as compared to FADEC 114N which may provide full backup capability to FADEC 114A. However, ABEC 124 comprises analog hardware, and because user controls 128 interface directly with ABEC 124, ABEC 124 and user controls 128 may communicate information freely, and without being susceptible to malicious activity, for example, during cyberattacks against controller 112, FADECs 114, or other components of system 100. As such, even if FADECs 114A and 114N are compromised simultaneously during a single cyberattack, ABEC 124 may offer at least some engine control capability associated with engine 116, so that system 100 may perform remedial actions to stop the attack or safely shut system 100 down.

In accordance with techniques of this disclosure, when system 100 is configured for digital control, controllable component 126 may receive commands from FADECs 114. Whereas, when system 100 is configured for analog control, controllable component 126 may receive commands from ABEC 124. System 100 may operate using digital controls or analog controls, depending on whether which of isolation components 132A and 132B is enabled and which is disabled.

System 100 may include protection component 130A and/or 130B. No matter which is used, protection components 130A and 130B control isolation components 132, causing each to be enabled or disabled, accordingly. Each of protection components 130A and 130B is configured to disable communication between FADECs 114 and controllable component 126. Conversely, each of protection components 130A and 130B is configured to enable communication between ABEC 124 and controllable component 126. In some examples, each of protection components 130A and 130B is configured to decouple battery 122 from every component of system 100 other than ABEC 124, e.g., to further isolate ABEC 124 from a potential cyberattack.

User controls 128 may include protection component 130A. Protection component 130A represents a user controllable component that is directly coupled to isolation components 132. Protection component 130A may share a mechanical, hydraulic, electrical, or non-electrical connection with each of isolation components 132; in any case, the connection shared between protection component 130A and isolation components 132 may be dedicated, isolated, and otherwise not susceptible to cyberattacks occurring at FADECs 114 or other parts of system 100.

For example, protection component 130A may be a physical switch in a cockpit of an aircraft. The physical switch may be coupled to a mechanical cable, rod, or other system that configures isolation system 100 to operate under analog or digital control. The connection between protection component 130A and each of isolation components 132 may be electrical or non-electrical. Manipulating the physical switch into one state may cause isolation components 132A and 132C to be enabled and conducting while isolation component 132B is disabled and not conducting; whereas manipulating the physical switch of protection component 130A to a different state may cause isolation components 132A and 132C to be disabled and not conducting while isolation component 132B is enabled and conducting. In some cases, for example, when the connection between protection component 130A and each of isolation components 132 is non-electrical, protection component 130A may be irreversible. In other words, when manipulated by a user, protection component 130A may cause isolation components 132 to irrevocably change states, from enabling digital, to enabling analog control.

For example, in cases where system 100 is part of an aircraft, when a pilot of the aircraft becomes aware that the pilot has lost control of engine 116 (e.g., due to a EMP, cyberattack, or other disruption to FADECs 114, the pilot may manipulate protection component 130A (e.g., the pilot may trip or open a fuse via mechanical or solid state electrical relay) to cut the fuel command from FADECs 114 to controllable component 126 while concurrently activating ABEC 124 to command controllable component 126. The pilot can, in response to activating ABEC 124, mechanically modulate engine 116 using analog controls.

Any of FADECs 114 may include a respective, protection component 130B. Protection component 130B, also referred to as a Trusted Protection Module (TPM) 130B, represents a machine controllable (as opposed to user controllable) component, similar to protection component 130A, that is directly coupled to isolation components 132. Protection component 130B may share a mechanical, hydraulic, electrical, or non-electrical connection with each of isolation components 132. The connection shared between protection component 130B and isolation components 132 may be dedicated, isolated, and otherwise not susceptible to cyberattacks occurring at FADECs 114 or other parts of system 100. Rather than be a user selectable switch, protection component 130B may be a relay, fuse, or other component that automatically changes states, to irreversibly cause system 100 to switch from digital to analog control. That is, protection component 130B may disable communication between FADECs 114 and controllable component 126 by irreversibly disabling an electric interface between FADECs 114 and controllable component 126.

Protection component 130B relies on FADECs 114 to identify when system 100 is under cyberattack or otherwise should revert to analog control. During normal operation, protection component 130B may receive a signal from FADECs 114 that causes protection component 130B to keep FADECs 114 in control of engine 116. For example, the signal from FADECs 114 may cause protection component 130B to maintain isolation components 132A and 132C enabled and conducting while isolation component 132B is maintained disabled and not conducting. However, during abnormal operation (e.g., in response to FADECs 114 identifying a situation when system 100 is under cyberattack or otherwise should revert to analog control), protection component 130B may fail to receive the signal from FADECs 114 that causes protection component 130B to keep FADECs 114 in control of engine 116.

In some examples, protection component 130B may prevent FADECs 114 from being in control of engine 116, while simultaneously giving ABEC 124 control of engine 116. For example, in response to failing to receive the signal from FADECs 114 that causes protection component 130B to keep FADECs 114 in control of engine 116, protection component 130B may switch and give ABEC 124 engine control. As another example, in response to receiving a different signal from FADECs 114, protection component 130B may put ABEC 124 in control of engine 116. In any event, either in response to a different signal or in response to not receiving the signal from FADECs 114, protection component 130B may disable isolation components 132A and 132C to cause isolation components 132A and 132C to cease conducting while enabling isolation component 132B to start conducting. In some cases, protection component 130B may be irreversible. In other words, when manipulated based on information from FADECs 114, protection component 130B may cause isolation components 132 to irrevocably change states, from enabling digital, to enabling analog control.

By relying on analog backup components, such as ABEC 124 and battery 122, an example system is less likely to experience a total system failure from an EMP or a cyberattack. A system that relies on the described circuits and techniques may be more robust during electrical disruption and hostile events, than other systems that rely on digital and digital backup components alone.

Figure 2:
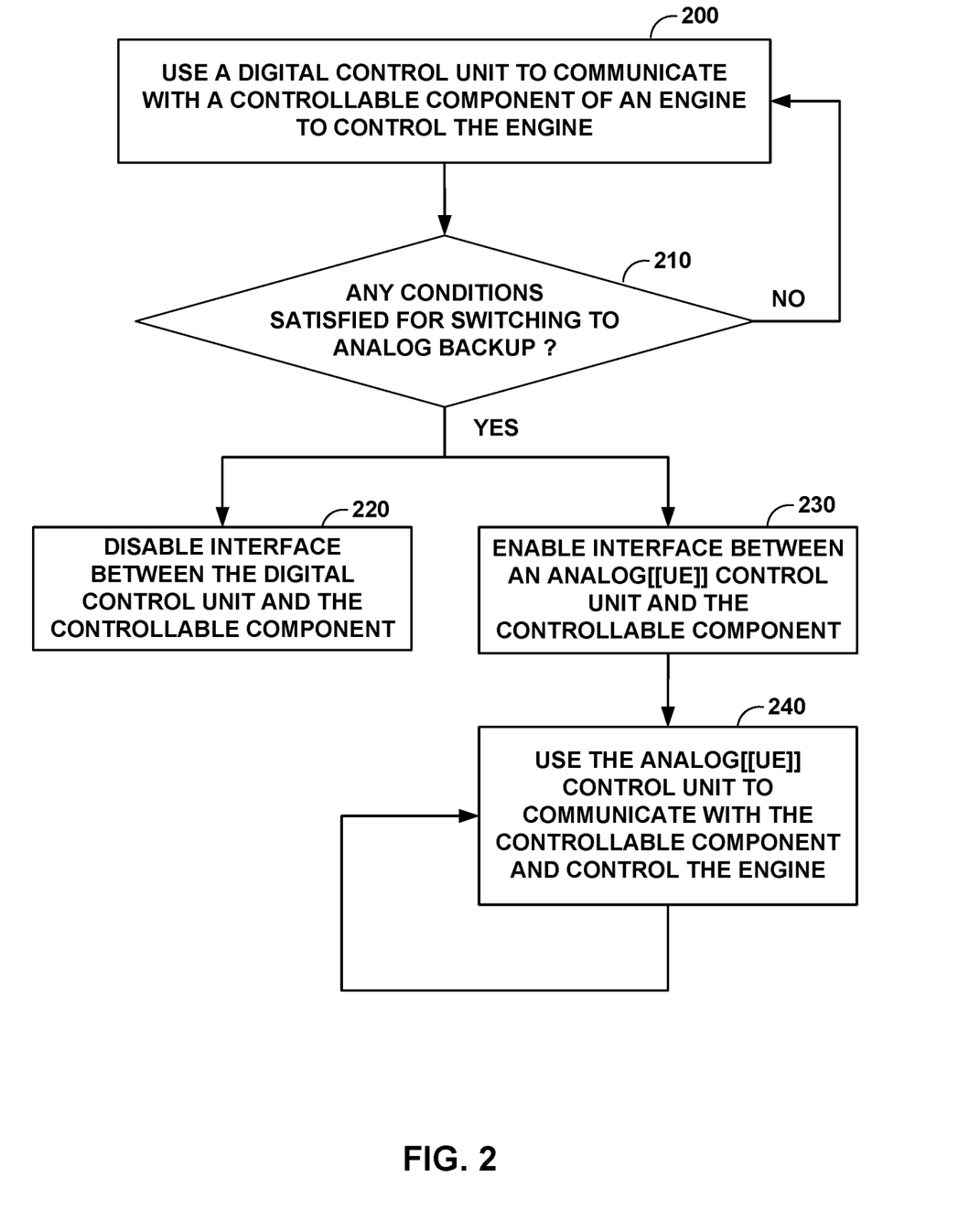
FIG. 2 is a flow chart illustrating example operations performed by an example system that includes an analog backup to one or more digital control units, in accordance with one or more aspects of the present disclosure.

FIG. 2 is a flow chart illustrating example operations performed by an example system that includes an analog backup to one or more digital control units, in accordance with one or more aspects of the present disclosure. FIG. 2 is described in the context of system 100 of FIG. 1.

In operation, system 100 may use a digital control unit to communicate with a controllable component of an engine to control the engine (200). For example, during normal operation in which system 100 is under digital control, isolation components 132A and 132C may enable electrical interfaces between, respectively, FADECs 114 and fuel pump meter unit 126, and regulation component 120 and battery 122. As such, when a user of system 100 provides inputs to user controls 128, controller 112 is configured to convert the inputs to commands for FADECs 114. FADECs 114 may control, based on the commands from controller 112, fuel pump meter unit 126 to control engine 116.

System 100 may determine whether any conditions have been satisfied for switching to an analog backup (210). For example, when configured as a TPM, protection component 130B may include logic, such as a lookup table and a feedback loop, for determining whether an observed response from engine 116 is inconsistent with commands to fuel pump meter unit 126, for determining whether system 100 is under cyberattack or otherwise experiencing a condition for switching to ABEC 124. In some cases, protection component 130B may include logic for determining whether any observed inputs to any of FADECs 114 are inconsistent with typical inputs normally received by FADECs 114, for determining whether system 100 is under cyberattack or otherwise experiencing a condition for switching to ABEC 124. In some examples, protection component 130B may likewise include logic for determining whether any observed outputs from any of FADECs 114 are inconsistent with typical outputs normally received from FADECs 114, for determining whether system 100 is under cyberattack or otherwise experiencing a condition for switching to ABEC 124.

In some examples, where user controls 128 includes protection component 130A, protection component 130A may determine that a condition has been satisfied for switching to an analog backup in response to detecting a change in position or state of a lever, switch, dial, or other one of user controls 128. For example, a pilot, a user, or other operator of system 100 may suspect that system 100 is under cyberattack or that digital controls have failed, and may want to revert to analog backup. The operator may flip a particular one of user controls 128. Protection component 130A may receive an indication from user controls 128 that the particular user control has been selected by the operator. Protection component 130A may determine that the particular user control has been selected based on information obtained by protection component 130, from a non-electrical interface (e.g., mechanical, etc.) between the particular control and protection component 130A. Protection component 130A may switch system 100 from being digital to analog controlled based on the indication from user controls 128.

System 100 may disable an interface between the digital control unit and the controllable component (220). For example, protection component 130A or 130B may generate and send a signal to isolation component 132A to prevent FADECs 114 from communicating or from sharing any electrical connection with fuel pump meter unit 126 that could be vulnerable during a cyberattack. The signal may disable a previously enabled electrical interface between controllable component 126 and FADECs 114. As such, by disabling the interface between FADECs 114 and controllable component 126, protection component 130A causes system 100 to cease controlling controllable component 126 with FADECs 114.

In addition, system 100 may enable an interface between an analog control unit and the controllable component (230). For example, protection component 130A or 130B may send a signal to isolation component 132B to enable ABEC 124 to communicate and share an interface with fuel pump meter unit 126 that is not vulnerable during a cyberattack. The signal may enable a previously disabled electrical interface between controllable component 126 and ABEC 124.

From then on, system 100 may use the analog control unit to communicate with the controllable component and control the engine (240). In other words, responsive to ceasing controlling controllable component 126 with FADECs 114, ABEC 124 controls controllable component 126 to control engine 116.

Clause 1. A system comprising: a controllable component of an engine configured to regulate fuel flow to the engine; a digital control unit configured to control the engine by at least communicating with the controllable component of the engine; a protection component configured to disable communication between the digital control unit and the controllable component of the engine; and an analog control unit configured to control the engine by at least communicating with the controllable component of the engine in response to the protection component disabling communication between the digital control unit and the controllable component of the engine.

Clause 2. The system of clause 1, wherein the protection component is configured to disable communication between the digital control unit and the controllable component of the engine by irreversibly disabling an electric interface between the digital control unit and the controllable component of the engine.

Clause 3. The system of any one of clauses 1 or 2, wherein the protection component is further configured to enable communication between the analog control unit and the controllable component of the engine while disabling communication between the digital control unit and the controllable component of the engine.

Clause 4. The system of clause 3, wherein the protection component is configured to enable communication between the analog control unit and the controllable component of the engine by enabling an electric interface between the analog control unit and the controllable component of the engine.

Clause 5. The system of any one of clauses 1-4, further comprising: an energy source electrically coupled to the analog control unit, wherein the analog control unit is configured to draw power from the energy source in response to the protection component disabling communication between the digital control unit and the controllable component of the engine.

Clause 6. The system of clause 5, wherein the protection components are further configured to isolate the energy source at least from the digital control unit in response to the protection component disabling communication between the digital control unit and the controllable component of the engine.

Clause 7. The system of any one of clauses 1-6, wherein: the digital control unit is further configured to receive first electrical power produced by power electronics that are coupled to the engine; the energy source is configured to receive second electrical power produced by the power electronics; and the protection components are further configured to disconnect the energy source is from the power electronics and cease receiving the second electrical power in response to the protection component disabling communication between the digital control unit and the controllable component of the engine.

Clause 8. The system of any one of clauses 1-7, further comprising: a user control that comprises the protection component, wherein the user control is configured to receive user input for disabling communication between the digital control unit and the controllable component of the engine.

Clause 9. The system of any one of clauses 1-8, wherein: the digital control unit comprises a trusted protection module that comprises the protection component; and the trusted protection module is configured to, in response to identifying a condition associated with the system, automatically trigger the protection component to disable communication between the digital control unit and the controllable component of the engine.

Clause 10. The system of clause 9, wherein the condition associated with the system comprises at least one of: a response from the engine that is inconsistent with commands to the fuel pump meter unit; inputs to a digital controller that are inconsistent with typical inputs normally received by the digital controller; or outputs from the digital control unit that are inconsistent with typical outputs normally received from the digital controller.

Clause 11. The system of any one of clauses 1-10, wherein the controllable component of the engine comprises at least one of a fuel pump metering unit or a variable vane.

Clause 12. A method comprising: controlling, with a digital engine controller of a system, a controllable component of an engine of the system to control the engine of the system; ceasing controlling the controllable component of the engine with the digital engine controller; and responsive to ceasing controlling the controllable component of the engine with the digital engine controller, controlling, with an analog engine controller of the system, the controllable component of the engine to control the engine.

Clause 13. The method of clause 12, wherein controlling the controllable component of the engine to control the engine with the analog engine controller comprises: disabling a previously enabled electrical interface between the controllable component of the engine and the digital control unit.

Clause 14. The method of any one of clauses 12 or 13, wherein controlling the controllable component of the engine to control the engine with the analog engine controller comprises: enabling a previously disabled electrical interface between the controllable component of the engine and the analog control unit.

Clause 15. The method of any one of clauses 12-14, wherein ceasing controlling the controllable component of the engine with the digital control unit is in response to a protection component of the system generating a signal to disable an electrical interface between the controllable component of the engine and the digital control unit Clause 16. The method of clause 15, further comprising: generating, by the protection unit, the signal to disable the electrical interface between the controllable component of the engine and the digital control unit in response to detecting one or more of: a response from the engine that is inconsistent with commands to the fuel pump meter unit; inputs to a digital controller that are inconsistent with typical inputs normally received by the digital controller; or outputs from the digital controller that are inconsistent with typical outputs normally received from the digital controller.

Clause 17. The method of any one of clauses 15 or 16, further comprising: receiving, by the protection unit, a user control input; and generating, by the protection unit, the signal to disable the electrical interface between the controllable component of the engine and the digital control unit in response to the user control input.

Clause 18. The method of any one of clauses 15-17, wherein the user control input is received by the protection unit via a non-electrical interface.

Clause 19. The method of any one of clauses 12-18, wherein ceasing controlling the controllable component of the engine with the digital control unit comprises disabling an electrical interface between power electronics coupled to the engine and a battery that powers the analog control unit.

Clause 20. A system comprising: means for controlling, with a digital engine controller, a controllable component of an engine to control the engine; means for ceasing controlling the controllable component of the engine with the digital engine controller; and means for responsive to ceasing controlling the controllable component of the engine with the digital engine controller, controlling, with an analog engine controller, the controllable component of the engine to control the engine.

Various examples have been described. These and other examples are within the scope of the following claims.

What is claimed is:
1. A system comprising:
a controllable component of an engine configured to regulate fuel flow to the engine;

digital control circuitry configured to control the engine by at least communicating with the controllable component of the engine;
backup digital control circuitry configured to control the engine, responsive to the digital control circuitry failing, by at least communicating with the controllable component of the engine;
a protection component comprising:
  input circuitry configured to send a disable signal to an isolation component that is not susceptible to cyberattacks when inputs to the digital control circuitry and the backup digital control circuitry are inconsistent with previous inputs to the digital control circuitry and the backup digital control circuitry;
  output circuitry configured to send the disable signal to the isolation component when outputs from the digital control circuitry and the backup digital control circuitry are determined to be inconsistent with previous outputs from the digital control circuitry and the backup digital control circuitry; and
  protection circuitry configured to disable, responsive to receiving the disable signal via the isolation component, communication between both the digital control circuitry and the backup digital control circuitry and the controllable component of the engine;
analog control circuitry configured to control the engine by at least communicating with the controllable component of the engine in response to the protection component disabling communication between both the digital control circuitry and the backup digital control circuitry and the controllable component of the engine;
analog controls mechanically coupled to the analog control circuitry to enable mechanical modulation of the engine; and
a battery electrically coupled to the analog control circuitry, wherein the analog control circuitry is configured to draw, in response to the protection component disabling communication between the digital control circuitry and the controllable component of the engine, power from the battery, and not draw power from power electronics that power the digital control circuitry.

2. The system of claim 1, wherein the protection component is configured to disable communication between the digital control circuitry and the controllable component of the engine by irreversibly disabling an electric interface between both the digital control circuitry and the backup digital control circuitry and the controllable component of the engine.

3. The system of claim 1, wherein the protection component is further configured to enable communication between the analog control circuitry and the controllable component of the engine while disabling communication between both the digital control circuitry and the backup digital control circuitry and the controllable component of the engine.

4. The system of claim 3, wherein the protection component is configured to enable communication between the analog control circuitry and the controllable component of the engine by enabling an electric interface between the analog control circuitry and the controllable component of the engine.

5. The system of claim 1, wherein the protection component is further configured to isolate the battery at least from the digital control circuitry in response to the protection component disabling communication between both the digital control circuitry and the backup digital control circuitry and the controllable component of the engine.

6. The system of claim 1, wherein the digital control circuitry is further configured to receive first electrical power produced by the power electronics that are coupled to the engine;
  wherein the battery is configured to receive second electrical power produced by the power electronics; and
  the protection component is further configured to disconnect the battery from the power electronics and cease receiving the second electrical power in response to the protection component disabling communication between both the digital control circuitry and the backup digital control circuitry and the controllable component of the engine.

7. The system of claim 1, further comprising:
  a user control that comprises the protection component, wherein the user control is configured to receive user input for disabling communication between both the digital control circuitry and the backup digital control circuitry and the controllable component of the engine.

8. The system of claim 1,
  wherein the protection component includes monitoring circuitry configured to:
    determine whether a response from the engine is inconsistent with commands to a fuel pump meter unit; and
    send the disable signal to the isolation component when the response from the engine is determined to be inconsistent with the commands to a fuel pump meter unit.

9. The system of claim 1, wherein the controllable component of the engine comprises at least one of a fuel pump metering unit or a variable vane.

10. The system of claim 1, wherein the battery is electrically isolated, responsive to ceasing controlling the controllable component of the engine with the digital engine controller, from the power electronics.

11. The method of claim 1, further comprising electrically isolating the battery from the power electronics used to power the digital engine controller circuitry.

12. A method comprising:
  controlling, with digital engine controller circuitry of a system, a controllable component of an engine of the system to control the engine of the system;
  sending, by a protection component, a disable signal to an isolation component that is not susceptible to cyberattacks when inputs to the digital engine controller circuitry are inconsistent with previous inputs to the digital engine controller circuitry;
  sending, by the protection component, the disable signal to the isolation component when outputs from the digital engine controller circuitry are determined to be inconsistent with previous outputs from the digital engine controller circuitry;
  ceasing controlling, responsive to receiving the disable signal via the isolation component, the controllable component of the engine with the digital engine controller circuitry, wherein ceasing controlling the controllable component includes disabling an electrical interface between power electronics coupled to the engine and a battery that powers analog engine controller circuitry; and
  responsive to ceasing controlling the controllable component of the engine with the digital engine controller circuitry, controlling, with the analog engine controller circuitry of the system, the controllable component of the engine to control the engine, wherein controlling, with the analog engine controller circuitry, the controllable component of the engine comprises drawing, with the analog engine controller circuitry and responsive to ceasing controlling the controllable component of the engine with the digital engine controller circuitry, power from the battery and not the power electronics, wherein analog controls are mechanically coupled to the analog control circuitry to enable mechanical modulation of the engine.

13. The method of claim 12, wherein controlling the controllable component of the engine to control the engine with the analog engine controller circuitry comprises:
disabling a previously enabled electrical interface between the controllable component of the engine and the digital engine controller circuitry.

14. The method of claim 12, wherein controlling the controllable component of the engine to control the engine with the analog engine controller circuitry comprises:
enabling a previously disabled electrical interface between the controllable component of the engine and the analog engine controller circuitry.

15. The method of claim 12, further comprising:
sending, by the protection component, the disable signal when a response from the engine that is inconsistent with commands to a fuel pump meter unit is detected.

16. The method of claim 12, further comprising:
receiving, by the protection component, a user control input; and
sending, by the protection component and responsive to receiving the user control input, the disable signal to the isolation component.

17. The method of claim 12, wherein the disable signal comprises a user control input provided to the protection component via a non-electrical interface.

18. A system comprising:
means for controlling, with a digital engine controller, a controllable component of an engine to control the engine;
means for sending a disable signal to an isolation component that is not susceptible to cyberattacks when inputs to the digital engine controller are inconsistent with previous inputs to the digital engine controller;
means for sending the disable signal to the isolation component when outputs from the digital engine controller are determined to be inconsistent with previous outputs from the digital engine controller;
means for ceasing controlling, responsive to receiving the disable signal received via the isolation component, the controllable component of the engine with the digital engine controller; and
means for, responsive to ceasing controlling the controllable component of the engine with the digital engine controller, controlling, with an analog engine controller, the controllable component of the engine to control the engine,
wherein the analog engine controller comprises means for drawing, responsive to ceasing controlling the controllable component of the engine with the digital engine controller, power from a battery that is electrically isolated from power electronics used to power the digital engine controller, wherein analog controls are mechanically coupled to the analog control circuitry to enable mechanical modulation of the engine.

* * * * *